Oct. 24, 1950     E. CRONHOLM     2,527,243
ADJUSTABLE MOUNT FOR CAMERA DIAPHRAGMS
Filed Feb. 5, 1948

INVENTOR.
EINAR CRONHOLM
BY
Linton and Linton
ATTORNEYS

Patented Oct. 24, 1950

2,527,243

UNITED STATES PATENT OFFICE 2,527,243

ADJUSTABLE MOUNT FOR CAMERA DIAPHRAGMS

Einar Cronholm, Goteborg, Sweden, assignor to Fritz Victor Hasselblad, Goteborg, Sweden Application February 5, 1948, Serial No. 6,373
In Sweden June 15, 1945

2 Claims. (Cl. 95—64)

1

In cameras provided with reflex finder and an iris diaphragm actuated by a rotationally mounted ring by the rotation of which the aperture of the iris may be varied it has been proposed to provide an adjusting ring rotationally mounted close to the first mentioned ring and adjustable in different angular positions, said rings being provided with abutments adapted to co-operate with each other so as to limit the rotational movement of the iris-actuating ring according to the angular position previously given the adjusting ring.

In cameras hitherto known provided with a device of this kind the adjusting ring is first given a suitable angular position with respect to exposure factors, i. e. actual light conditions and desired time of exposure, whereupon the camera is focused with an entirely open iris. After the focusing of the camera the iris-actuating ring is rotated, as far as permitted by the abutment of the adjusting ring, whereby the desired size of the iris aperture is obtained and the camera is ready for exposure.

In cameras of this kind hitherto known the adjusting ring is usually provided with a device for locking said ring in the desired angular position which locking device must be released by a manipulation for each change of the angular position of the adjusting ring.

The present invention has for its object to simplify the adjustment of the iris.

The invention is broadly characterized in that on the adjusting ring there is provided a locking member actuated by a spring keeping said member in contact with a fixed ring provided with a series of recesses with which the locking member is adapted to co-operate so as temporarily to retain the said adjusting ring in the desired angular position, and also in that an abutment of the iris diaphragm actuating ring is provided with an oblique surface adapted to co-operate with the said locking member so as to retain said member in engagement with the recess with which the locking member is temporarily in engagement.

In a camera provided with a device according to the invention the adjusting ring may by a simple grasp be rotated to the desired angular position, in which said ring will be automatically locked as the locking member is actuated by the above-named oblique surface when rotating the iris actuating ring in order to adjust the iris.

Figure 1:
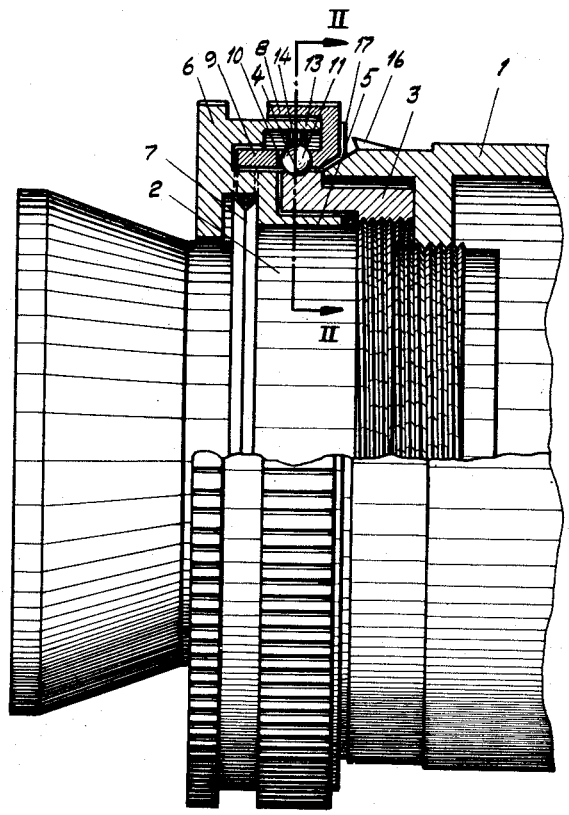
Figure 2:
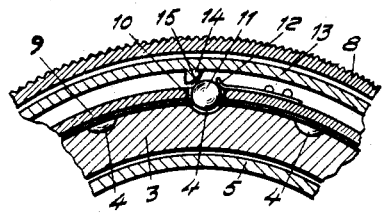

An embodiment of the invention is shown by way of example on the accompanying drawing, wherein Figure 1 shows, partly in axial section,

2 the front portion of a camera with a finder of the mirror reflex type and provided with a device according to the invention. Figure 2 shows a section along the line II—II in Figure 1.

In the drawing I denotes a tube projecting from the front wall of the camera casing (not shown) and 2 a lens sleeve screwed into the front end of the tube. On the lens sleeve 2 there is screwed a ring 3 of angle-shaped section, which at the periphery is formed with a series of recesses 4. Within the ring 3 there is rotationally mounted a ring 6 by means of the cylindrical portion 5 and this ring is adapted, when rotated, to actuate an iris diaphragm in known manner in order to adjust the aperture or light opening. Upon the ring 3 there is rotationally mounted a ring 8 of U-shaped cross section. The cylindrical portion 9 of the ring 8 situated adjacent the ring 3 is provided with a radial recess or opening 10 in which is radially movable a ball 11 of a diameter greater than the thickness of the ring portion 9. The ball 11 is forced towards the periphery of the ring 3 by a spring 12, fastened to the ring portion 9, and co-operates with the aforesaid recesses 4 when rotating the ring 8, thereby exerting a slightly increased resistance against the rotational movement of the ring 8 when the ball 11 is in register with a recess. At the inside of a cylindrical flange 13, offset axially from the ring 6, and facing the ring portion 9, there is provided an inwardly projecting pin 14 formed at its free end with an obliquely disposed surface 15 adapted to co-operate with the ball 11. When the ring 8, 9 is rotated in a clockwise direction according to Figure 2 so as to bring the pin 14 in contact with the ball 11 (assuming the latter is resting in one of the recesses 4) the oblique surface 15 will lock the ball in said recess thus preventing a further rotational movement of the ring 8, 9 in the said direction. A scale 17 provided at the rear end surface of the ring 8, 9, and by co-operating with an index 16 provided at the front end of the tube 1, is adapted to indicate the size of the light opening of the iris diaphragm corresponding to the actual angular position of the ring 8, 9.

When adjusting the iris the ring 8, 9 is firstly rotated to an angular position corresponding to the desired light opening, whereupon, after the camera has been focused with entirely opened iris, the light opening is reduced by rotating the ring 6 till the pin 14 prevents a further rotating movement of the ring 6, by locking the ball 11 as aforesaid.

The invention is not limited to the embodiment above described and shown in the drawing but may be varied in details without departing from the spirit. For instance, the ball 11 may be replaced by an equivalent member, for instance, a suitably formed portion of the spring 12.

What I claim is:

1. An improvement in adjustable mounts for iris diaphragms comprising a fixed ring mounted on the camera lens sleeve, an iris diaphragm actuating ring rotatably mounted in said fixed ring, an adjustment ring rotatably mounted on said fixed ring and abutments carried by said rotatable rings adapted to cooperate with one another in order to limit the rotational movement of said actuating ring according to the angular position of said adjusting ring, a resilient locking member carried by said adjusting ring, said fixed ring having a series of recesses each for receiving said locking member and temporarily retaining said adjusting ring in a desired angular position and the abutment of said iris actuating ring being formed with an oblique surface adapted for retaining said locking means in engagement with one of said recesses when said surface is engaged by said locking means upon rotation of said actuating ring.

2. An improvement in adjustable mounts for iris diaphragms comprising a fixed ring mounted on the camera lens sleeve, an iris diaphragm actuating ring rotatably mounted in said fixed ring, an adjustment ring rotatably mounted on said fixed ring and abutments carried by said rotatable rings adapted to cooperate with one another in order to limit the rotational movement of said actuating ring according to the angular position of said adjusting ring, said adjusting ring having an opening formed therein, a ball rotatable in said opening, a spring carried by said adjusting ring and bearing downwardly on said ball, said fixed ring having a series of recesses each for receiving said ball therein and temporarily retaining said adjusting ring in a desired angular position and the abutment of said iris actuating ring being formed with an oblique surface for maintaining said ball in one of said recesses when said surface is engaged by said ball upon rotation of said actuating ring.

EINAR CRONHOLM.

REFERENCES CITED

The following references are of record in the file of this patent:

UNITED STATES PATENTS

| Number | Name | Date |
|---|---|---|
| 2,222,298 | Nerwin | Nov. 19, 1940 |
| 2,269,401 | Steiner | Jan. 6, 1942 |
| 2,322,034 | Lee | June 15, 1943 |